US012557819B2

(12) United States Patent
Mroz et al.

(10) Patent No.: US 12,557,819 B2
(45) Date of Patent: Feb. 24, 2026

(54) POULTRY SKINNER BELT PROFILE

(71) Applicant: JBT Marel Corporation, Chicago, IL (US)

(72) Inventors: Cezary J. Mroz, Lewis Center, OH (US); Wyatt W. Wills, Newark, OH (US); Barry K. Jones, Columbus, OH (US); Cameron Logan, Columbus, OH (US); Richard K. Reis, Mount Gilead, OH (US); William Hinson, Jacksonville, FL (US); Matthew Bonnes, Columbus, OH (US)

(73) Assignee: JBT Marel Corporation, Chicago, IL (US)

( * ) Notice: Subject to any disclaimer, the term of this patent is extended or adjusted under 35 U.S.C. 154(b) by 0 days.

(21) Appl. No.: 18/677,507

(22) Filed: May 29, 2024

(65) Prior Publication Data

US 2024/0397961 A1    Dec. 5, 2024

Related U.S. Application Data

(60) Provisional application No. 63/505,334, filed on May 31, 2023.

(51) Int. Cl.
A22C 21/00          (2006.01)

(52) U.S. Cl.
CPC ...... A22C 21/0092 (2013.01); A22C 21/0053 (2013.01)

(58) Field of Classification Search
CPC .. A22C 21/0092; A22C 21/0053; B65G 15/42
USPC ........................................ 452/125
See application file for complete search history.

(56) References Cited

U.S. PATENT DOCUMENTS

| | | | | |
|---|---|---|---|---|
| 2,925,165 | A | 2/1960 | Rake | |
| 6,264,542 | B1 | 7/2001 | Gasbarro | |
| 8,187,060 | B1 * | 5/2012 | Gasbarro | ........... A22C 21/0092 |
| | | | | 452/130 |
| 9,999,234 | B1 | 6/2018 | Diab | |

(Continued)

FOREIGN PATENT DOCUMENTS

DE      20 2015 104 909 U1      10/2015

OTHER PUBLICATIONS

International Search Report and Written Opinion mailed Sep. 23, 2024, issued in corresponding International Patent Application No. PCT/US2024/031462, 15 pages.

*Primary Examiner* — Richard T Price, Jr.
(74) *Attorney, Agent, or Firm* — Christensen O'Connor Johnson Kindness PLLC

(57)          ABSTRACT

An endless conveyor belt may include a belt body having a belt longitudinal axis and an exterior side. A plurality of protrusions project from the exterior side of the belt body and extend across a width of the belt body substantially transversely to the belt longitudinal axis. A plurality of corresponding valleys are defined between each of the plurality of protrusions and extend across the width of the belt body substantially transversely to the belt longitudinal axis. When a piece of poultry is positioned on the exterior side of the belt body, substantially only a skin portion of the piece of poultry is received within the valleys, and an underlying fat portion and a meat portion of the piece of poultry remains disposed substantially above a top surface of the plurality of protrusions.

8 Claims, 7 Drawing Sheets

(56)          References Cited

U.S. PATENT DOCUMENTS

| | | | | |
|---|---|---|---|---|
| 10,617,126 | B2 | 4/2020 | Gasbarro | |
| 11,559,059 | B2 | 1/2023 | Wills et al. | |
| 2011/0092146 | A1* | 4/2011 | Gasbarro ........... | A22C 21/0092 |
| | | | | 452/125 |
| 2013/0157553 | A1* | 6/2013 | Haines ............... | A22C 21/0092 |
| | | | | 452/125 |
| 2017/0000139 | A1 | 1/2017 | Avey et al. | |
| 2019/0327984 | A1 | 10/2019 | Gasbarro | |
| 2022/0400693 | A1* | 12/2022 | Wills .................... | B65G 13/06 |

* cited by examiner

POULTRY SKINNER BELT PROFILE

CROSS-REFERENCE TO RELATED APPLICATION

This application claims the benefit of U.S. Provisional Application No. 63/505,334, filed May 31, 2023, the entire contents of which are incorporated herein by reference.

BACKGROUND

The skin of poultry pieces or other types of meat is often removed prior to retail sales due to consumer demands. Automated skin removal machines have been developed for removing the skin from poultry pieces without the need to perform this task manually. In some machines, the skin is gripped and pulled away from or off of the underlying flesh as the poultry pieces are transported to a skinning station on an infeed conveyor, and then the skinned poultry pieces are transported away from the skinning station on an outfeed conveyor.

Some automated skin removal machines are complicated in design, requiring many components that increase maintenance and cleaning costs. Some of the less complicated designs are prone to damaging the meat of the poultry and/or pulling the skin off without leaving any fat attached to the meat.

Systems and methods disclosed herein relate to improved automated skin removal machines including the infeed conveyor belt for use with the automated skin removal machines.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some aspects, the systems and techniques described herein relate to an endless conveyor belt for an automated skin removal machine configured to skin a piece of poultry having a skin portion and an underlying meat portion and fat portion, the endless conveyor belt including: a belt body having a belt longitudinal axis and an exterior side; a plurality of protrusions projecting from the exterior side of the belt body and extending across a width of the belt body substantially transversely to the belt longitudinal axis; a plurality of corresponding valleys defined between each of the plurality of protrusions and extending across the width of the belt body substantially transversely to the belt longitudinal axis, and wherein when a piece of poultry is positioned on the exterior side of the belt body, substantially only a skin portion of the piece of poultry received within the valleys, and wherein an underlying fat portion and a meat portion of the piece of poultry remains disposed substantially above a top surface of the plurality of protrusions.

In some aspects, the systems and techniques described herein relate to an automated skin removal machine, including: a skinning station, including: a pinch block including an arcuate pinch surface; a hold down structure positioned above the pinch block and configured to impose a downward force on a piece of poultry passing through the skinning station; an infeed conveyor for transporting poultry pieces to the skinning station, the infeed conveyor having an infeed endless conveyor belt configured to wrap around an end roller positioned adjacent to the arcuate pinch surface of the pinch block, the infeed endless conveyor belt including: a belt body having a belt longitudinal axis and an exterior side; a plurality of protrusions projecting from the exterior side of the belt body and extending across a width of the belt body substantially transversely to the belt longitudinal axis, wherein a truncated top surface of the plurality of protrusions is configured to substantially engage the arcuate pinch surface of the pinch block when the infeed endless conveyor belt wraps around the end roller; a plurality of corresponding valleys defined between each of the plurality of protrusions and extending across the width of the belt body substantially transversely to the belt longitudinal axis, and wherein when a piece of poultry is positioned on the exterior side of the belt body, substantially only a skin portion of the piece of poultry is received within the valleys, and wherein an underlying fat portion and a meat portion of the piece of poultry remains disposed substantially above the truncated top surface of the plurality of protrusions, wherein when the piece of poultry passes over a leading edge of the arcuate pinch surface of the pinch block, the skin portion becomes entrapped between the exterior side of the belt body and the arcuate pinch surface of the pinch block such that upon continued translation of the infeed endless conveyor belt, the skin portion is pulled away from the meat portion and at least some of the fat portion; and an outfeed conveyor for transporting skinned poultry pieces away from the skinning station.

In some aspects, the techniques described herein relate to a method of skinning a piece of poultry having a skin portion and an underlying meat portion and fat portion, including: loading the piece of poultry onto an exterior side of an infeed conveyor belt skin side down such that substantially only a skin portion of the piece of poultry is received within valleys defined between adjacent protrusions projecting from the exterior side of a belt body of the infeed conveyor belt and extending across a width of the belt body substantially transversely to a belt longitudinal axis; conveying the piece of poultry on the infeed endless conveyor belt to a skinning station having a pinch block including an arcuate pinch surface and a hold down structure positioned above the pinch block and configured to impose a downward force on the piece of poultry passing through the skinning station; entrapping the skin portion of the piece of poultry between the arcuate pinch surface of the pinch block and the exterior side of the belt body as the infeed endless conveyor belt wraps around an end roller positioned adjacent to the arcuate pinch surface of the pinch block; pulling the skin portion pulled away from the meat portion and at least some of the fat portion as the infeed endless conveyor continues to move around the end roller; and transporting skinned poultry pieces having at least some fat portion away from the skinning station.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Systems and methods disclosed herein relate to improved automated skin removal machines including the infeed conveyor belt used with the machines. In general, the improved infeed conveyor belt may be used with a less complicated machine while effectively removing the skin, without substantially damaging the meat, and without removing excess fat.

An existing automated skin removal machine is described in U.S. Pat. No. 6,264,542, entitled "Poultry skinner with belt." Such a machine removes skin from poultry by using a gripper wheel in combination with a pinch surface of a pinch block. More specifically, an infeed conveyor is used to transport a piece of poultry to a rotatably mounted gripper wheel having radially extending fins adapted to engage the lower surface of the piece of poultry passing over the gripper wheel. An arcuate pinch surface is mounted in a closely spaced relationship to the arcuate path traveled by the tips of rotating fins and defines therein an opening for trapping the outer skin. The skin attached to the poultry is trapped between the arcuate pinch surface and the outer end of the rotating gripper wheel to entrap a portion of the skin and pull the skin from the poultry product. The poultry pieces are transported over a gap between the indeed conveyor and an outfeed conveyor by an upper conveyor, which may use "sticker chain" to grip the poultry piece.

Figure 1:
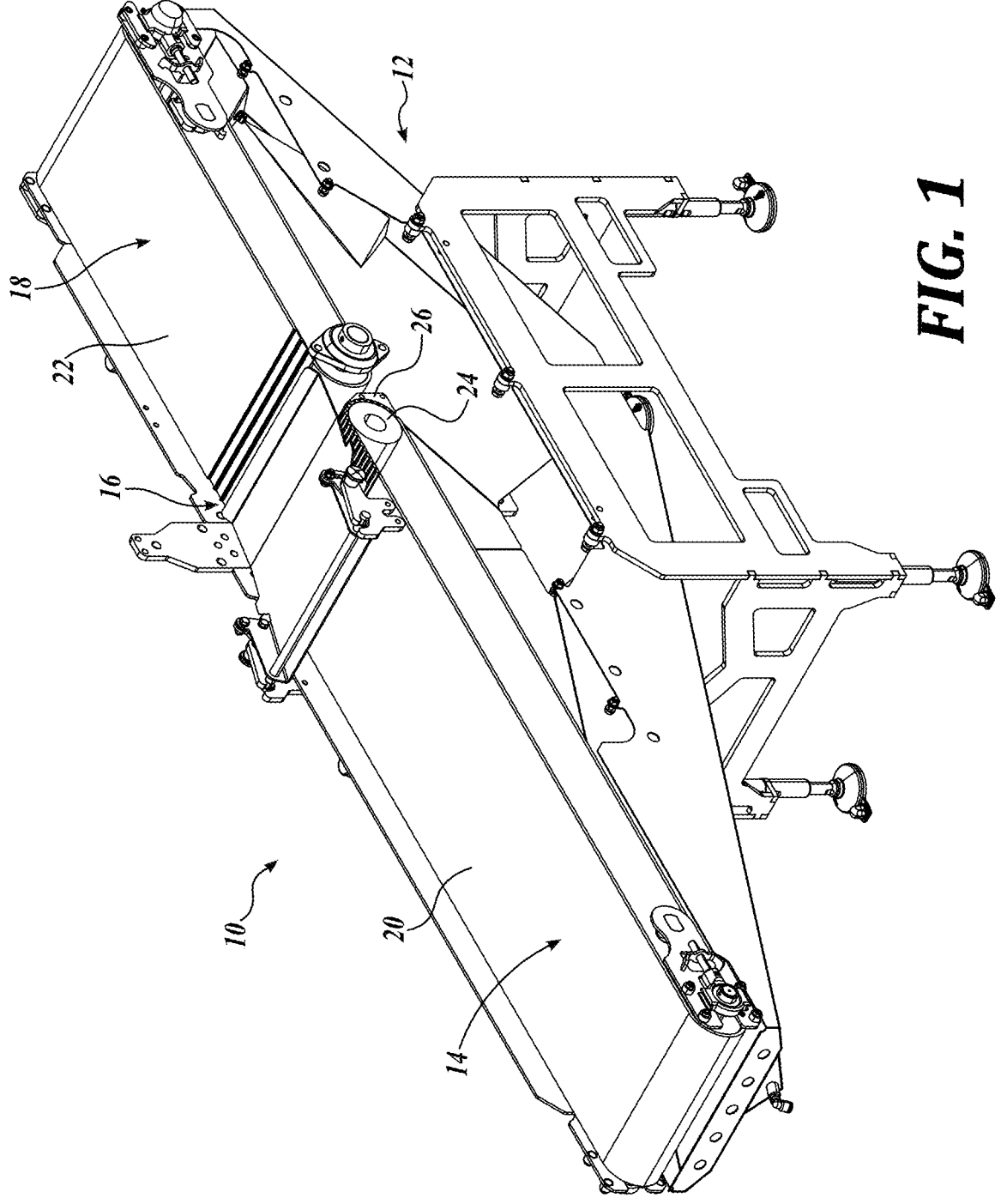
FIG. 1 is an isometric view of an exemplary automated skin removal machine having an infeed endless conveyor belt formed in accordance with aspects of the present disclosure.
Figure 2:
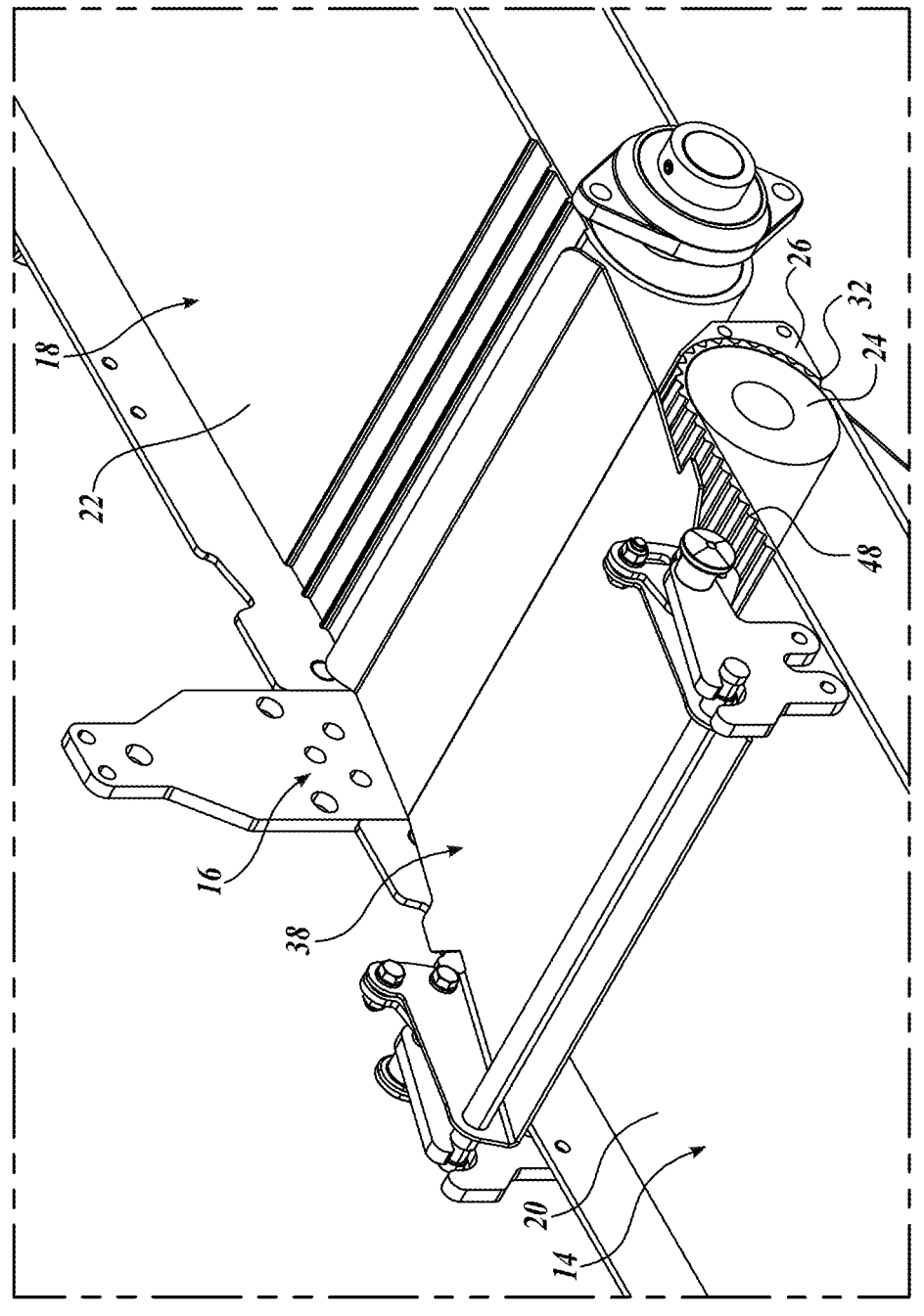
FIG. 2 is an isometric view of a skinning station of the exemplary automated skin removal machine of FIG. 1.
Figure 3:
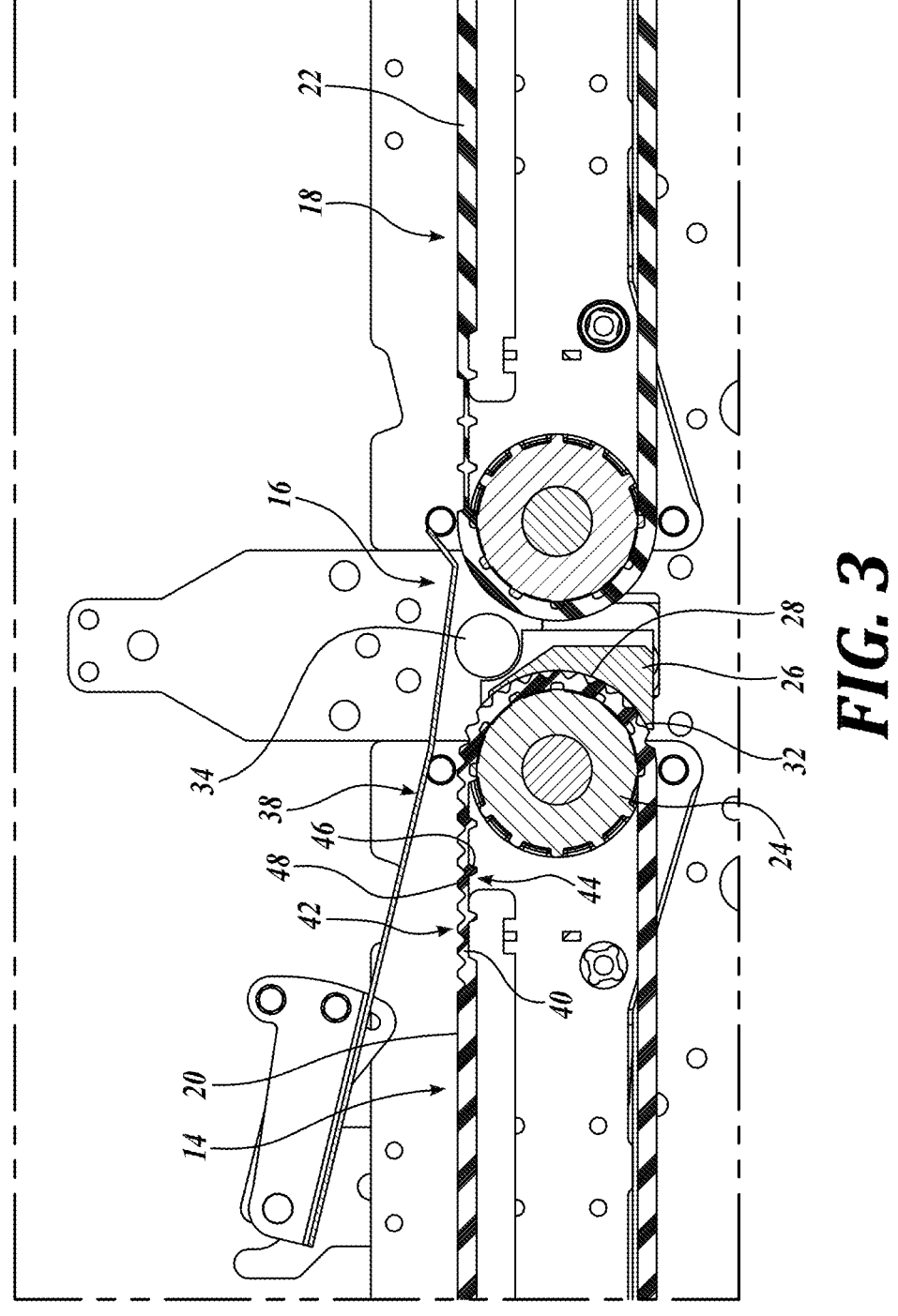
FIG. 3 is a cross-sectional view of the skinning station of the exemplary automated skin removal machine of FIG. 1.

FIGS. 1-3 depicts an automated skin removal machine 10 that eliminates the rotating gripper wheel and upper conveyor while effectively removing skin from a piece of poultry or another type of meat or fish having skin (hereinafter collectively referred to "a piece of poultry" or the like). In general, the automated skin removal machine 10 uses only an infeed conveyor 14 in combination with an arcuate pinch surface 28 of a pinch block 26. The infeed conveyor 14 transports a piece of poultry to a downstream end of the conveyor 14, and as the piece of poultry passes over a powered transfer roller 34 in between the infeed conveyor 14 and an outfeed conveyor 18, the skin attached to the poultry is trapped between the arcuate pinch surface 28 and the outer end of the conveyor 14. The skin is pulled from the piece of poultry as it continues to move toward the outfeed conveyor 18.

Certain aspects of the automated skin removal machine 10 are substantially identical to the apparatus shown and described in U.S. patent Ser. No. 11/559,059, entitled "Poultry skinner," the entire contents of which are hereby expressly incorporated herein. In that regard, certain detailed aspects of the automated skin removal machine 10 will not be described.

In basic form, the automated skin removal machine 10 includes a frame 12 for supporting the infeed conveyor 14 for transporting and feeding poultry products (sometimes hereinafter simply called "poultry pieces") to be skinned from an inlet end to a skinning station 16 located closely adjacent the downstream end of the conveyor 14. An outfeed conveyor 18 is also supported by the frame 12 to carry the skinned poultry pieces away from the skinning station 16 for further processing. The infeed conveyor 14 includes an infeed endless conveyor belt 20, and the outfeed conveyor 18 includes an outfeed conveyor endless belt 22.

The infeed endless conveyor belt 20 is trained around an end roller 24 at the downstream end of the infeed conveyor 14. A pinch block 26 is configured with a concave pinch surface 28 having a curvature closely following the curvature of the infeed endless conveyor belt 20 trained around the end roller 24. A narrow gap 32 is defined between the arcuate pinch surface 28 and the infeed endless conveyor belt 20 for trapping the skin. The poultry piece is arranged skin-down on the infeed endless conveyor belt 20 (i.e., with the skin against the outer surface of the belt) such that the skin of the poultry piece is captured in the gap 32. In other words, the skin gets trapped between the infeed endless conveyor belt 20 and the arcuate pinch surface 28. The trapped skin is pulled downwardly by the infeed endless conveyor belt 20 as the belt travels around the end roller 24. As a result, the infeed endless conveyor belt 20 pulls the skin downwardly away from the underlying flesh of the poultry piece.

A powered transfer roller 34, located between the adjacent ends of the infeed and outfeed conveyors 14 and 18, assists in transferring the skinned poultry piece to the outfeed conveyor. In addition, a hold down structure 38 is provided for applying downward pressure on the poultry piece as the poultry piece is carried by the infeed conveyor 14 towards the skinning station 16, while the poultry skin is being removed, and while the skinned poultry piece is being transferred from the infeed conveyor 14 to the outfeed conveyor 18. The transfer roller 34 together with the hold down structure 38 support the poultry piece as it moves laterally toward the outfeed conveyor 18, opposing the downward pulling forces of the skin as it is pulled downwardly by the infeed endless conveyor belt 20.

The infeed endless conveyor belt 20, which has a unique outer profile for effectively removing the skin without substantially damaging the meat and without removing excess fat, will now be described in more detail with additional reference to FIGS. 4-6. In general, the infeed endless conveyor belt 20 is a monolithic form having a belt body 40 with an outer or exterior side 42 and an inner or interior side 44. The inner or interior side 44 includes a suitable profile having interior flights or interior protrusions 46 configured to engage a correspondingly shaped profile on an exterior surface of the end roller 24 such that the belt moves with the end roller 24 during rotation of the end roller.

The exterior side 42 of the infeed endless conveyor belt 20 includes a suitable profile for trapping skin between the belt and the arcuate pinch surface 28 of the pinch block 26 as the belt travels along the arcuate pinch surface. In general, the infeed endless conveyor belt 20 includes a plurality of flights or transverse exterior protrusions 48 defined on the exterior side 42 that enable the belt to grip the exterior of the skin of the poultry piece being transported on the belt. The protrusions 48 also enable the belt to capture and grip the skin while the skin is being pulled through the gap 32 between the belt and the arcuate pinch surface 28 of the pinch block 26.

A plurality of flights or transverse protrusions 48 project or extend from the exterior side 42 of the belt body 40 across a width of the infeed endless conveyor belt 20 generally transversely to a longitudinal axis of the belt. Corresponding valleys 50 are defined on the exterior side 42 of the infeed endless conveyor belt 20 between each of the plurality of transverse protrusions 48. In that regard, the valleys 50 likewise extend across the width of the infeed endless conveyor belt 20 generally transversely to the longitudinal axis of the belt.

Figure 4:
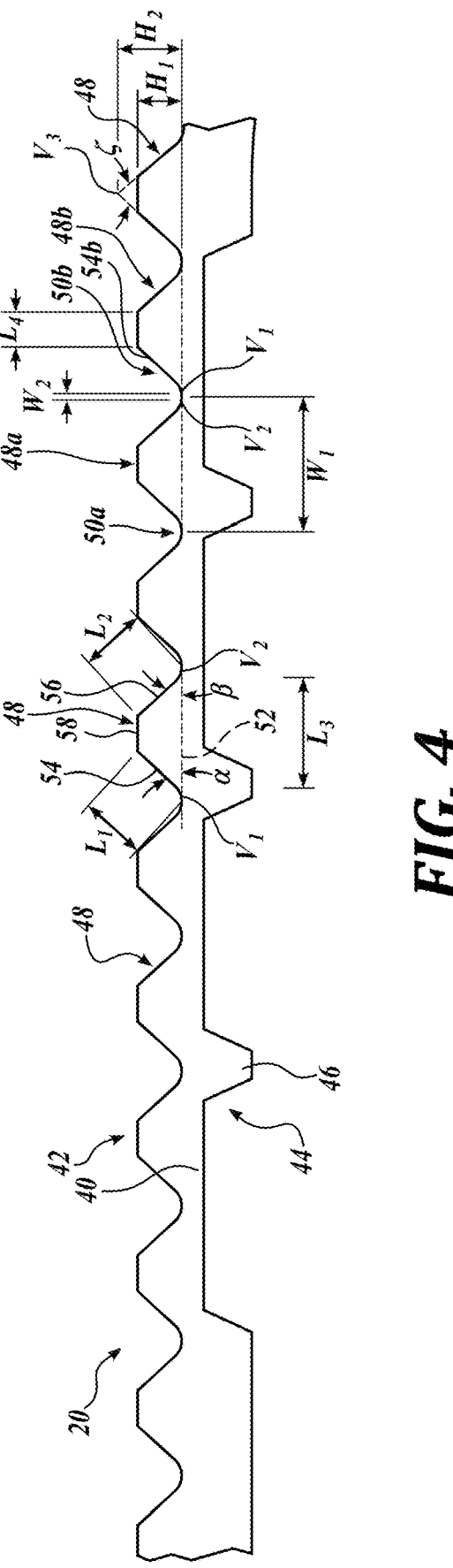
FIG. 4 is a cross-sectional view of a portion of the infeed endless conveyor belt of the exemplary automated skin removal machine of FIG. 1.
Figure 5:
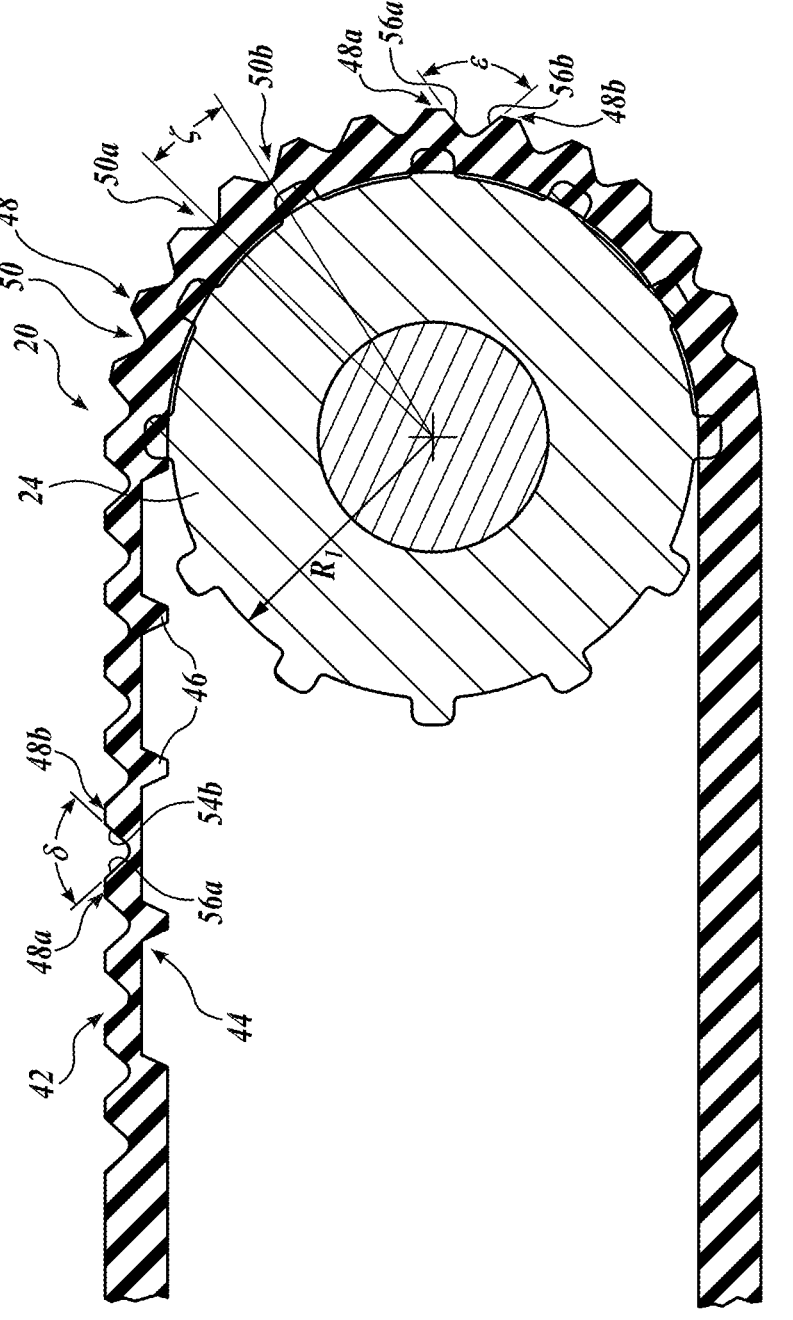
FIG. 5 is a cross-sectional view of a portion of the infeed endless conveyor belt of the exemplary automated skin removal machine of FIG. 1 shown wrapped around an end roller.

As can be seen by referring to FIGS. 4 and 5, the cross-sectional shape of each of the plurality of transverse protrusions 48 is substantially uniform along its length. Likewise, the cross-sectional shape of each of the corresponding valleys 50 is substantially uniform along its length. Further, the shape and size of each of the plurality of transverse protrusions 48 is substantially identical, and the shape and size of each of the corresponding valleys 50 is substantially identical. In other words, the profile of the exterior side 42 of the infeed endless conveyor belt 20 includes a repeating pattern of transverse protrusions 48 and corresponding valleys 50. For ease of illustration, only a portion of the repeating pattern of protrusions 48 and corresponding valleys 50 along the length of the belt 20 is shown in the FIGS.

Each of the plurality of transverse protrusions 48 and valleys 50 on the exterior side 42 of the infeed endless conveyor belt 20 are uniquely shaped and sized to effectively trap the skin between the belt and the pinch block 26 as the belt travels around the end roller 24 without substantially damaging the meat and without removing excess fat. The configuration of the plurality of transverse protrusions 48 will first be described.

Each protrusion 48 has a cross-sectional shape that is generally a truncated isosceles triangle that is symmetrical about a midline, with the longest side of the triangle defining a bottom side 52 of the protrusion 48. With the infeed endless conveyor belt 20 being of monolithic form, the bottom side 52 of each protrusion 48 essentially extends along and forms part of the belt body 40 (and accordingly, the representative bottom side 52 is shown in dashed lines). A lead face or first protrusion side 54 extends upwardly from a first end of the bottom side 52 of the protrusion 48, forming a first vertex $V_1$ between the first protrusion side 54 and the bottom side 52. A trailing face or second protrusion side 56 substantially equal in length to the first protrusion side 54 extends upwardly from a second end of the bottom side 52, forming a second vertex $V_2$ between the second protrusion side 56 and the bottom side 52. The first and second protrusion sides 54 and 56 extend upwardly toward a third vertex $V_3$ (represented in dashed lines) but intersect a truncated top surface 58 extending transversely across the top of the protrusion 48 substantially parallel to the belt axis.

A representative length $L_1$ extending between the first vertex $V_1$ and the third vertex $V_3$ of the protrusion 48, which is substantially equal to a representative length $L_2$ extending between the second vertex $V_2$ and the third vertex $V_3$ may be about sixty to seventy-five percent (70-80%) of a length $L_3$ of the bottom side 52 of the protrusion 48 extending between the first vertex $V_1$ and the second vertex $V_2$. For instance, the first and second representative lengths $L_1$ and $L_2$ may be about seventy-four percent (74%) of the length $L_3$ of the bottom side 52. In the illustrated example, the first and second lengths $L_1$ and $L_2$ are about 6.91 mm, and length $L_3$ of the bottom side 52 is about 9.37 mm. In some instances, the length $L_3$ of the bottom side 52 may be defined as the distance along the belt 20 that extends between mid-points of adjacent corresponding valleys 50, labeled $W_1$. In that regard, the length $L_3$ would be about 12.18 mm.

If the protrusion 48 had effective first and second lengths $L_1$ and $L_2$, the height $H_2$ of the protrusion would be about 5.73 mm. However, as noted above, the first and second protrusion sides 54 and 56 intersect a truncated top surface 58 extending transversely across the top of the protrusion 48. The truncated top surface 58 intersects the first and second protrusion sides 54 and 56 at about seventy-five percent (75%) of the effective first and second lengths $L_1$ and $L_2$. In that regard, the truncated top surface 58 also intersects the protrusion 48 at about seventy-five percent (75%) of the effective height $H_2$. As a result, the overall height $H_1$ of the protrusion 48 is about 4 mm in the illustrated example. Further, the length $L_4$ of the truncated top surface 58, which is related to its location along the overall height $H_1$ of the protrusion 48, is about 3.18 mm in the illustrated example.

A first interior angle $\alpha$ is defined between the first protrusion side 54 and the bottom side 52, and a second interior angle R is defined between the second protrusion side 56 and the bottom side bottom side 52. As shown, the first interior angle $\alpha$ is substantially equal to the second interior angle $\beta$ (e.g., $\alpha=0$). A third interior angle $\gamma$, which would be defined between the first protrusion side 54 and the second protrusion side 56 without the truncated top surface 58, is one hundred eighty degrees less the sum of the first interior angle $\alpha$ and the second interior angle $\beta$. In one example, the substantially identical angles $\alpha$ and R may be between about forty to fifty degrees (40-50°). In that regard, the third interior angle $\gamma$ may be between about eighty to one hundred to degrees (80-100°). In the illustrated example, the substantially identical first and second angles $\alpha$ and $\beta$ are about forty-seven and a half degrees (47.5°), and the third interior angle $\gamma$ is about eighty-five degrees (85°).

The valleys 50 are generally defined by the protrusion sides of adjacent protrusions 48 in combination with flat portions of the exterior side 42 of the belt body 40 extending between adjacent protrusions 48. In that regard, the entire space defined between adjacent protrusions 48 may be considered to be a "valley" in which the skin of a poultry piece can be received during conveyance and thereafter trapped between the infeed endless conveyor belt 20 and the pinch block 26 as the belt travels around the end roller 24.

Referring to FIG. 4, a second valley 50b is generally defined between a second protrusion side 56a of a first protrusion 48a and a first protrusion side 54b of a second, adjacent protrusion 48b. In that regard, a bottom of the second valley 50b generally extends along the exterior side 42 of the belt body 40 between a first vertex $V_1$ of the first protrusion 48a and a second vertex $V_2$ of the second, adjacent protrusion 48b.

A curved transition is defined at the intersection of the exterior side 42 of the belt body 40 and the second and first protrusion sides 56a and 54b of the first and second adjacent protrusions 48a and 48b. In this manner, entrapment of debris, bacteria, etc. is minimized. More specifically, a curved rather than sharp interface between the protrusions 48 and the corresponding valleys 50 enables easy cleaning of the infeed endless conveyor belt 20 between production runs.

The first vertex $V_1$ of the first protrusion 48*a* and a second vertex $V_2$ of the second, adjacent protrusion 48*b* are generally close together (such as 2.81 mm as noted below). Thus, with curved transitions defined at the intersection of the exterior side 42 of the belt body 40 and the second and first protrusion sides 56*a* and 54*b* of the first and second adjacent protrusions 48*a* and 48*b*, there is effectively no flat portion defined along the bottom of the valleys 50. Rather, each valley 50 generally defines a curved groove or connection between adjacent protrusions 48. In other words, a curved surface generally extends between adjacent protrusions 48.

In some examples, and as discussed in further detail below, the spacing between adjacent protrusions may be increased. More specifically, the width of the valleys or the distance between the first vertex $V_1$ of the first protrusion 48*a* and a second vertex $V_2$ of the second, adjacent protrusion 48*b* may be increased. As a result, a substantially flat portion may be defined on the exterior side 42 of the belt 20 along the bottom of each of the valleys 50.

Referring to FIGS. 3 and 5, the protrusions 48 and corresponding valleys 50 are spaced along the axial length of the infeed endless conveyor belt 20 such that a predetermined number of protrusions 48 extend from the belt body 40 along a length of the belt. For instance, the spacing of the protrusions 48 and corresponding valleys 50 may determine the number of protrusions 48 extending from the belt body 40 along the length of the belt on the portion of the belt wrapped around the end roller 24. For purposes of this description, the portion of the infeed endless conveyor belt 20 wrapped around the end roller 24 is the portion of the belt wrapped around about half the circumference of the end roller 24 with the end roller 24 having a circumference of about 11.94 inches (based on an end roller radius dimension $R_1$ of 1.9 inches).

Based on the spacing of the protrusions 48 and corresponding valleys 50 as well as the circumference of the end roller 24, a predetermined number of protrusions 48 engage the arcuate pinch surface 28 of the pinch block 26 as the infeed endless conveyor belt 20 moves past the pinch block. The number of protrusions 48 engaging the pinch block 26 (in addition to the profile of the protrusions 48 described herein) impact the effectiveness of the skinning station 16. Generally, a greater number of protrusions 48 engaging the arcuate pinch surface 28 of the pinch block 26 pull skin from the poultry piece less aggressively (e.g., less damage to the meat portion of smaller poultry pieces during skinning, more fat left on the meat, etc.). By contrast, a lower number of protrusions 48 engaging the arcuate pinch surface 28 of the pinch block 26 generally pull skin from the poultry piece more aggressively (e.g., more damage to the meat portion of smaller poultry pieces during skinning, less fat left on the meat, etc.). In that regard, the spacing of the protrusions 48 and corresponding valleys 50 may be dictated by the type of poultry being skinned (e.g., chicken v. turkey v. duck, large bird v. medium bird v. small bird, etc.), the type of poultry piece being skinned (e.g., breast v. thigh), the level of skinning needed (skin with all fat removed, skin with some fat removed, skin with substantially no fat removed, etc.), and other factors.

In the illustrated example, the protrusions 48 and corresponding valleys 50 are spaced along the axial length of the infeed endless conveyor belt 20 such that about fourteen (14) protrusions 48 extend from the belt body 40 on the portion of the belt wrapped around the end roller 24, which is about half the circumference of the end roller as noted above. In combination with the unique profile of the protrusions 48 and corresponding valleys 50, such a spacing is optimal for less aggressively skinning smaller pieces of poultry.

More specifically, the illustrated infeed endless conveyor belt 20 can be used to effectively skin smaller pieces of poultry (e.g., pieces from smaller birds, wings v. breasts, etc.) without damaging the meat portion (e.g., without entrapping any part of the meat between the belt and the pinch block, without damaging the meat portion during conveyance, etc.) and while being able to leave a sufficient amount of fat attached to the meat portion (e.g., without pulling all the fat off along with the skin). In some examples, the spacing between adjacent protrusions 48 may be increased from that shown for skinning larger pieces of poultry, for removing more fat from the piece of poultry, etc.

Detailed aspects of the protrusions 48 and corresponding valleys 50 for supporting a desired spacing of protrusions 48 extending from the belt body 40 along a length of the belt (such as on the portion of the belt wrapped around the end roller 24) will now be described with reference to FIGS. 4 and 5. With the infeed endless conveyor belt 20 in a substantially flat configuration as shown in FIG. 4, a spacing $W_1$ of about 12.18 mm is defined between mid-points of adjacent corresponding valleys 50, such as between first and second valleys 50*a* and 50*b*. The mid-point of a valley may be considered the lowest, central point of the valley.

The width $W_2$ of a valley 50 is also relevant to the spacing of protrusions 48 extending from the belt body 40. With reference to FIG. 4, the width $W_2$ of a valley 50 is generally defined by the length of the exterior side 42 of the belt body 40 extending between a first vertex $V_1$ of a first protrusion 48*a* and a second vertex $V_2$ of a second, adjacent protrusion 48*b*. In the example shown, the width $W_2$ of each valley 50 is about 1.66 mm.

As noted above, the spacing between adjacent protrusions 48 may be increased from that shown for skinning larger pieces of poultry, for removing more fat from the piece of poultry, etc. In that regard, the spacing $W_1$ between mid-points of adjacent corresponding valleys 50 and the width $W_2$ of a valley 50 for other belt variations may be generally as shown in Table 1 below.

TABLE 1

| Examples of variations in protrusion spacing for belt. | | | | |
|---|---|---|---|---|
| Dimension | Belt 1 | Belt 2 | Belt 3 | Belt 4 |
| $W_1$ (spacing between mid-points of adjacent corresponding valleys) | 12.67 mm | 13.86 mm | 15.58 mm | 17.71 mm |
| $W_2$ (width of a valley) | 2.16 mm | 3.35 mm | 5.07 mm | 7.21 mm |

With the infeed endless conveyor belt 20 in a substantially flat configuration as shown in FIG. 4, a first opening flight angle δ is defined between first and second adjacent protrusions 48*a* and 48*b*. The first opening flight angle δ is defined by the second protrusion side 56*a* of the first protrusion 48*a* and the first protrusion side 54*b* of the second, adjacent protrusion 48*b* when the infeed endless conveyor belt 20 in a substantially flat configuration. In the example shown, the first opening flight angle δ is about eighty-five degrees (85°).

As the infeed endless conveyor belt 20 wraps around the end roller 24, the protrusions effectively spread out around the circumference of the end roller 24. In that regard, the space between adjacent protrusions 48 increases to a second opening flight angle ε. The second opening flight angle ε is defined by the second protrusion side 56*a* of the first protrusion 48a and the first protrusion side 54b of the second, adjacent protrusion 48b when the infeed endless conveyor belt 20 is wrapped around the end roller 24. In the example shown, the second opening flight angle F is about ninety degrees (90°). With the infeed endless conveyor belt 20 wrapped around the end roller 24 in the illustrated example, a spacing angle 7 between adjacent valleys 50a and 50b is about thirteen and a half degrees (or more precisely, 13.6°).

The infeed endless conveyor belt 20 is of course made from a suitable material that allows the belt 20 to flex and wrap around the end roller 24. Moreover, the infeed endless conveyor belt 20 is made from a suitably flexible material that allows the spacing between the protrusion 48 to transition from the first opening flight angle δ to the second opening flight angle F. In one example, the infeed endless conveyor belt 20 may be made from thermoplastic polyurethane (TPU) or another similar food-grade material.

Figure 6:
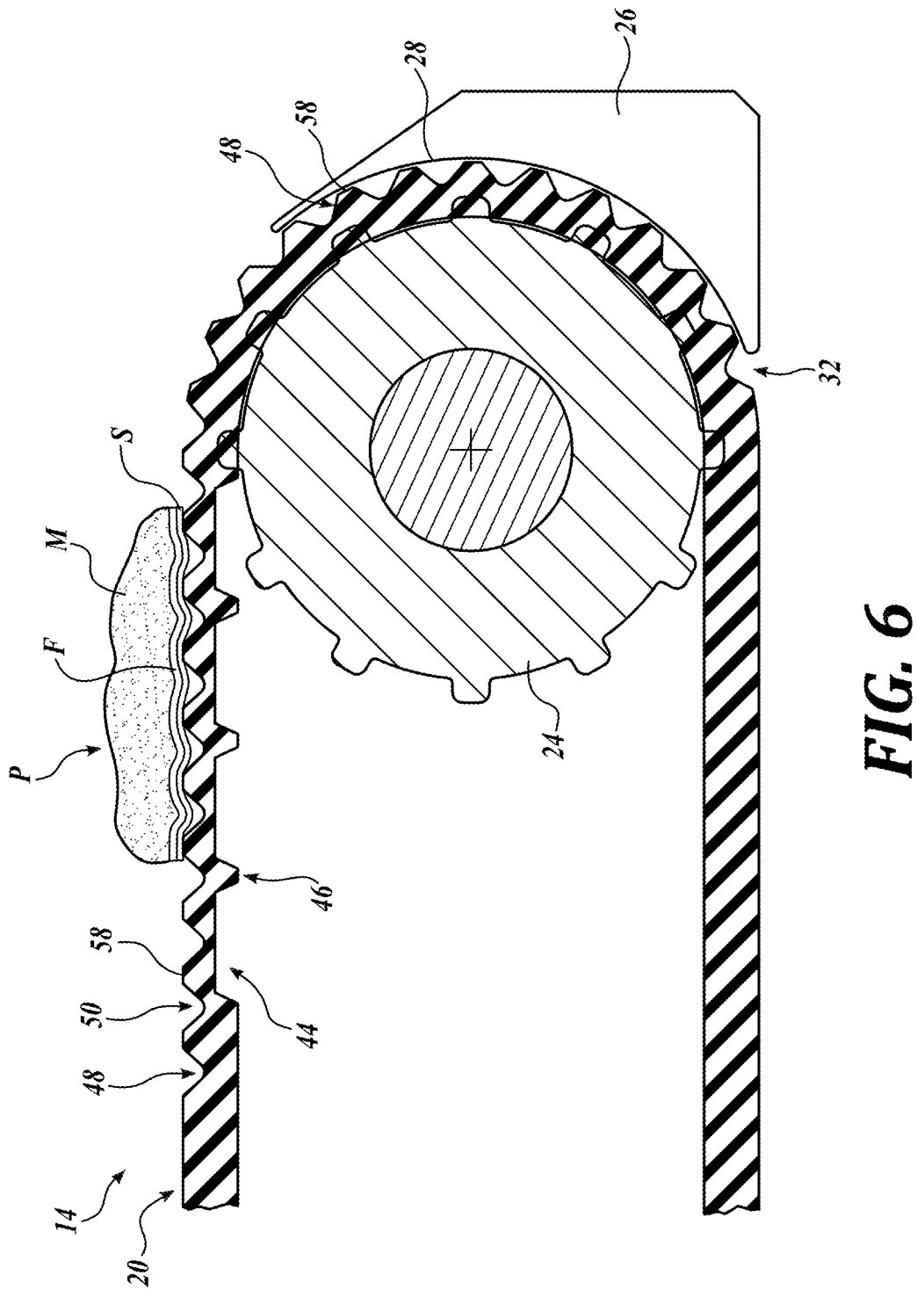
FIG. 6 is a cross-sectional view of a portion of the infeed endless conveyor belt of the exemplary automated skin removal machine of FIG. 1 shown wrapped around an end roller, wherein a piece of poultry is being conveyed on an exterior surface of the infeed endless conveyor belt toward a pinch block positioned adjacent to the end roller.
Figure 7:
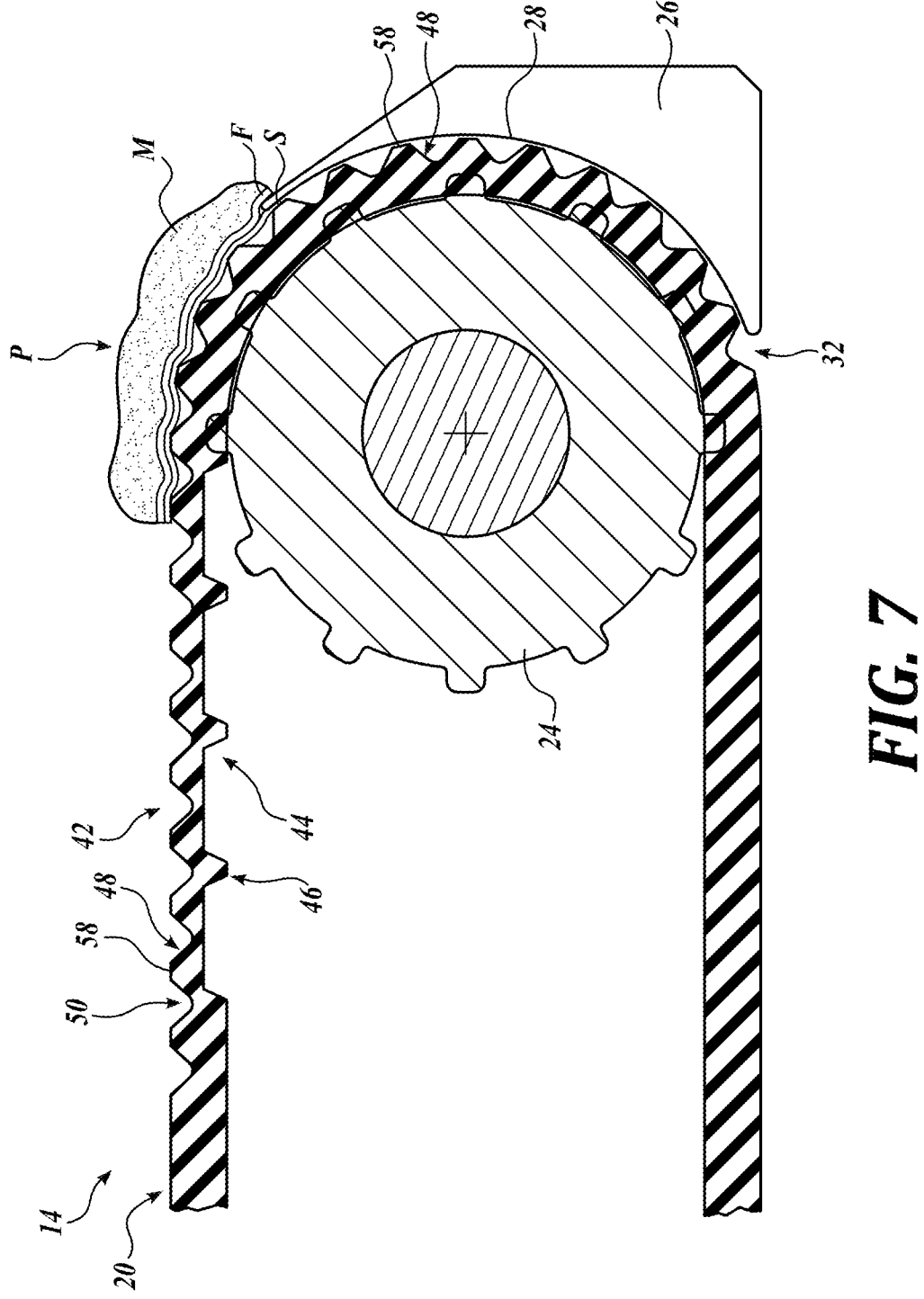
FIG. 7 is a cross-sectional view of a portion of the infeed endless conveyor belt of the exemplary automated skin removal machine of FIG. 1 shown wrapped around an end roller, wherein a skin portion of a piece of poultry is becoming entrapped between an exterior surface of the infeed endless conveyor belt and a pinch block positioned adjacent to the end roller.

Referring to FIGS. 3, 6, and 7, a method of operation of the automated skin removal machine 10 using an infeed endless conveyor belt 20 described herein will now be provided. It should be appreciated that although the description provided herein is with reference to the automated skin removal machine 10 shown in the FIGS., the infeed endless conveyor belt 20 may be used with any similar automated skin removal machine.

Poultry pieces are loaded skin-side down onto the infeed conveyor 14 at a product feed inlet end (e.g., at the end of the infeed conveyor 14 opposite the skinning station 16). FIG. 6 shows a poultry piece P loaded skin-side down (with the skin labeled as "S") onto the exterior side 42 of the infeed conveyor 14. When loaded skin-side down, the skin S of each poultry piece P engages the protrusions 48 extending from the exterior side 42 of the infeed endless conveyor belt 20. As the pieces P are conveyed toward the skinning station 16, the skin S at is at least somewhat received in (e.g., slumps within) the corresponding valleys 50 between each of the protrusions 48, as shown with the skin S of the poultry piece P in FIG. 6. However, with the protrusions 48 sized and shaped as described herein, substantially no portion of the underlying meat M and little to no portion of the underlying fat F of the poultry piece P falls into the valleys 50 between each of the protrusions 48. Rather, the underlying meat M and at least a portion of the fat F remain disposed substantive above the truncated top surface 58 of the protrusions 48.

The poultry pieces P are conveyed along the infeed conveyor 14 in a substantially flat orientation until they reach the skinning station 16. Upon reaching the skinning station 16, a leading end of the poultry piece P falls downwardly over the upstream end of the infeed conveyor 14 as the infeed endless conveyor belt 20 starts to turn over the end roller 24 as shown in FIG. 7. As the leading end of the poultry piece P falls downwardly over the upstream end of the infeed conveyor 14, the skin S, which is received within the valleys 50 between each of the protrusions 48 of the infeed endless conveyor belt 20, passes beneath an upper, leading end/edge of the pinch block 26. As such, the skin S gets trapped in the gap 32 defined between the infeed endless conveyor belt 20 and the arcuate pinch surface 28 of the pinch block 26.

The infeed endless conveyor belt 20 is positioned relative to the pinch block 26 such that the truncated top surface 58 of each protrusion 48 substantially engages or closely follows along the arcuate pinch surface 28 of the pinch block 26. A minimal clearance is defined between the truncated top surface 58 and the arcuate pinch surface 28 to trap/pinch the skin S therebetween for pulling the skin from the underlying fat F and meat portion M. In that regard, the gap 32 defined between the infeed endless conveyor belt 20 and the arcuate pinch surface 28 of the pinch block 26 is essentially defined by the valleys 50 between each of the protrusions 48 as well as any clearance between the truncated top surface 58 and the arcuate pinch surface 28.

The skin S trapped in the gap 32 is pulled downwardly by the infeed endless conveyor belt 20 as the belt travels around the end roller 24. As a result, the infeed endless conveyor belt 20 pulls the skin downwardly away from the underlying fat F and meat M of the poultry piece. With only the skin S received within the valleys 50 and therefore the gap 32, the skin S is pulled downwardly with substantially no portion of the underlying fat F and meat M of the poultry piece being removed or getting trapped between the infeed endless conveyor belt 20 and the pinch block 26.

As noted above, the protrusions 48 effectively spread out around the circumference of the end roller 24 as the infeed endless conveyor belt 20 wraps around the end roller 24. As the protrusions 48 spread out, the skin S trapped between the protrusions 48 and the arcuate pinch surface 28 of the pinch block 26 is pulled taught or is somewhat stretched along its length. By stretching the skin length as it is pulled downwardly, the skin can more effectively be peeled/separated or pulled away from the underlying meat M and fat F.

The separated fat F and meat M of the poultry piece is transferred to the outfeed conveyor 18 for any further processing, packaging, sorting, etc. The outfeed endless conveyor belt 22 may also be flighted or textured in a manner similar to that of the infeed conveyor belt 20. Instead, the outfeed endless conveyor belt 22 may be flighted or textured in a different manner, perhaps with greater spacing between adjacent flights/protrusions seeing as the poultry piece has already been skinned.

Referring back to FIG. 6, during conveyance along the infeed endless conveyor belt 20, the skin S at least somewhat slumps into the corresponding valleys 50 between each of the protrusions 48, as noted above. Moreover, with the protrusions 48 sized and shaped as described herein, substantially no portion of the underlying fat F and/or meat M of the poultry piece P falls into the valleys 50 between each of the protrusions 48. In that regard, the minimal spacing of the valleys 50 between adjacent protrusions 48, in combination with the gradual tapered shape of the protrusions 48, cause substantially only the skin S to fall into the valleys 50. Substantially no portion of the underlying fat F and/or meat M of the poultry piece P falls into the valleys 50. Accordingly, minimal gravitational pulling force is applied to the underlying fat F and/or meat M during conveyance. In that regard, the conveyance along the infeed conveyor 14 does not substantially damage or alter the underlying fat and/or meat of the pieces.

By comparison, if the protrusions had greater spacing therebetween and/or if the protrusions were more pointed and less gradual in shape, a significant portion of the underlying fat and/or meat would fall into the gaps between each of the protrusions, especially for smaller pieces of poultry. For reference, if the protrusions shown on the outfeed conveyor 18 in FIGS. 2 and 3 were used on the infeed conveyor 14, a significant portion of the underlying fat and/or meat would fall into the gaps between each of the protrusions. Such an undulation in the poultry piece as it is conveyed and as it passes through the skinning station 16 can damage delicate or smaller pieces of underlying fat/meat. Nevertheless, as noted above, an increase in spacing between adjacent protrusions may be desired for skinning larger pieces of poultry, for removing more fat from the piece of poultry, etc.

While the concepts of the present disclosure are susceptible to various modifications and alternative forms, specific examples thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one example," "an example," "an exemplary example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "upstream", "downstream", "left", "right", "first", "second", etc., in the present disclosure is meant to provide orientation for the reader with reference to the drawings and is not intended to be the required orientation of the components or graphical images or to impart orientation limitations into the claims.

In the present disclosure the term "poultry piece" should be understood to include any piece of meat that may be skinned by the automated skin removal machine.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative FIG. Additionally, the inclusion of a structural or method feature in a particular FIG. is not meant to imply that such feature is required in all examples and, in some examples, it may not be included or may be combined with other features.

Methods according to the above-described examples can be implemented using computer-executable instructions that are stored or otherwise available from computer-readable media of a computing device in communication with the automated skin removal machine. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Systems implementing methods according to this disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example. The instructions, media for conveying such instructions, computing resources for executing them, and other structures for supporting such computing resources are means for providing the functions described in these disclosures.

Various examples of the disclosure are discussed in detail above. While specific implementations are discussed, it should be understood that this description is for illustration purposes only. A person skilled in the relevant art will recognize that other components and configurations may be used without parting from the spirit and scope of the disclosure. Thus, the description and drawings herein are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various examples given in this specification.

Without intent to limit the scope of the disclosure, examples of machines, components, methods and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. As used herein, the terms "about", "approximately," etc., in reference to a number, is used herein to include numbers that fall within a range of 10%, 5%, or 1% in either direction (greater than or less than) the number unless otherwise stated or otherwise evident from the context (except where such number would exceed 100% of a possible value).

While illustrative embodiments have been illustrated and described, it will be appreciated that various changes can be made therein without departing from the spirit and scope of the invention.

The invention claimed is:

1. An automated skin removal machine, comprising:

a skinning station, comprising:
  a pinch block including an arcuate pinch surface; and
  a hold down structure positioned above the pinch block and configured to impose a downward force on a piece of poultry passing through the skinning station;

an infeed conveyor for transporting poultry pieces to the skinning station, the infeed conveyor having an infeed endless conveyor belt configured to wrap around an end roller positioned adjacent to the arcuate pinch surface of the pinch block, the infeed endless conveyor belt comprising:
  a belt body having a belt longitudinal axis and an exterior side;
  a plurality of protrusions projecting from the exterior side of the belt body and extending across a width of the belt body substantially transversely to the belt longitudinal axis, wherein a truncated top surface of the plurality of protrusions is configured to substantially engage the arcuate pinch surface of the pinch block when the infeed endless conveyor belt wraps around the end roller; and
  a plurality of corresponding valleys defined between each of the plurality of protrusions and extending across the width of the belt body substantially transversely to the belt longitudinal axis,
  wherein when a piece of poultry is positioned on the exterior side of the belt body, substantially only a skin portion of the piece of poultry is received within the valleys, and wherein an underlying fat portion and a meat portion of the piece of poultry remains disposed substantially above the truncated top surface of the plurality of protrusions, and
  wherein when the piece of poultry passes over a leading edge of the arcuate pinch surface of the pinch block, the skin portion becomes entrapped between the exterior side of the belt body and the arcuate pinch surface of the pinch block such that upon continued translation of the infeed endless conveyor belt, the skin portion is pulled away from the meat portion and at least some of the fat portion; and an outfeed conveyor for transporting skinned poultry pieces away from the skinning station.

2. The automated skin removal machine of claim 1, wherein each of the plurality of protrusions has a cross-sectional shape generally of a truncated isosceles triangle.

3. The automated skin removal machine of claim 2, wherein each of the plurality of protrusions has a first protrusion side extending upwardly from a bottom side extending along the belt body and a second protrusion side extending upwardly from the bottom side, the first and second protrusion sides substantially equal in length and longer than a length of the bottom side.

4. The automated skin removal machine of claim 1, wherein each valley defines a curved surface extending between adjacent protrusions.

5. The automated skin removal machine of claim 1,
  wherein a first opening flight angle is defined between first and second adjacent protrusions when the endless conveyor belt is in a substantially flat configuration, and
  wherein a second opening flight angle greater than the first opening flight angle is defined between first and second adjacent protrusions when the endless conveyor belt wraps around a roller of a conveyance system.

6. The automated skin removal machine of claim 5, wherein the first opening flight angle is about eighty-five degrees (85°), and wherein the second opening flight angle is about ninety degrees (90°).

7. The automated skin removal machine of claim 3, wherein the first and second protrusion sides each have a length of about 6.91 mm, and the bottom side has a length of about 9.37 mm.

8. The automated skin removal machine of claim 3, wherein a first angle defined between the first protrusion side and the bottom side is about forty-seven and a half degrees (47.5°), and a second angle defined between the second protrusion side and the bottom side is about forty-seven and a half degrees (47.5°).

* * * * *